Sept. 17, 1963 W. W. MOUNT 3,104,210
SOLAR STILLS
Original Filed May 10, 1952 2 Sheets-Sheet 1
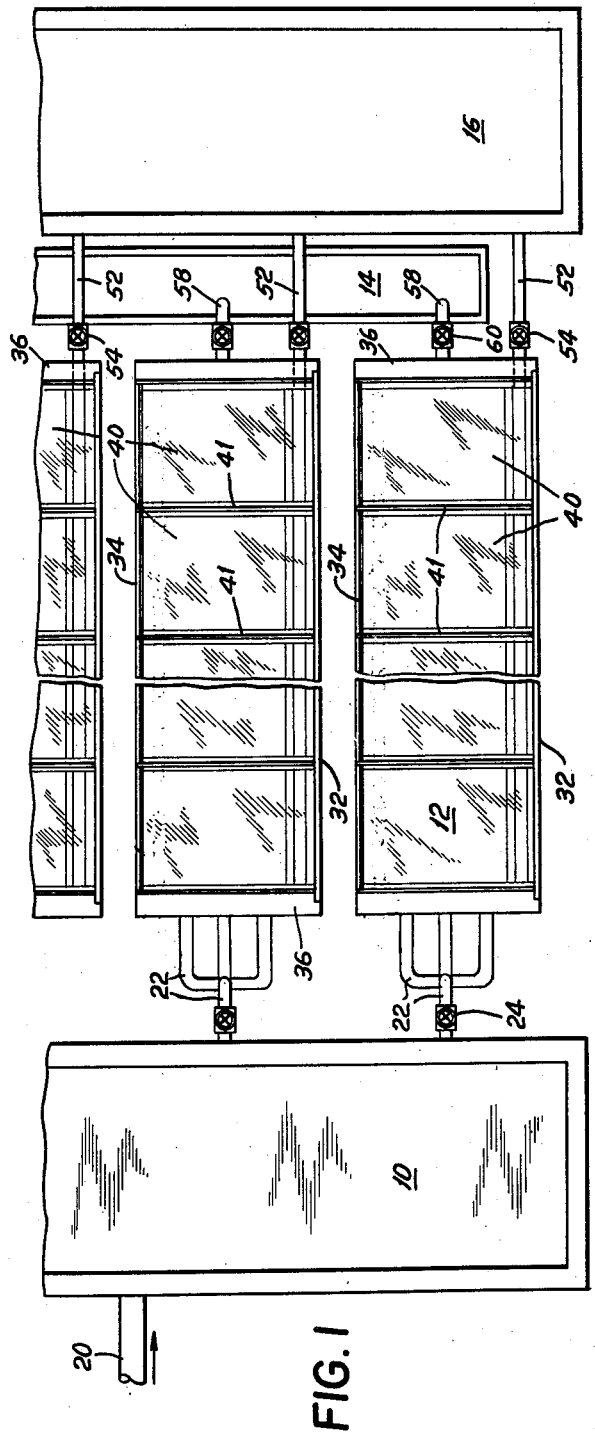
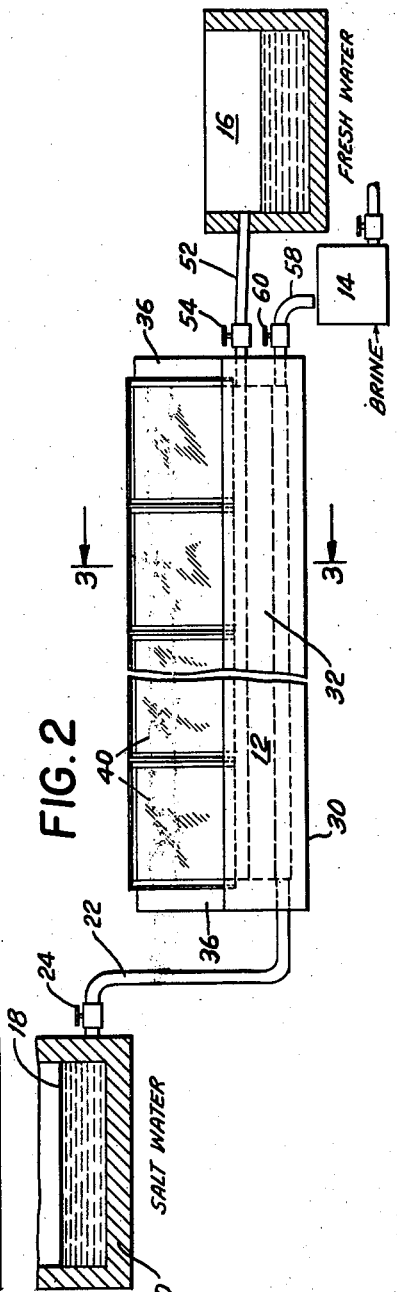
INVENTOR.
WADSWORTH W. MOUNT
BY
MORGAN, FINNEGAN, DURHAM & PINE
ATTORNEYS Sept. 17, 1963  W. W. MOUNT  3,104,210
SOLAR STILLS Original Filed May 10, 1952  2 Sheets-Sheet 2

INVENTOR.
WADSWORTH W. MOUNT
BY
MORGAN, FINNEGAN, DURHAM & PINE
ATTORNEYS

United States Patent Office 3,104,210
Patented Sept. 17, 1963

3,104,210
SOLAR STILLS
Wadsworth W. Mount, Summit, N.J., assignor of nine and eight-tenths percent to each of the following: James L. Buckley, Aloise B. Heath, John W. Buckley, Priscilla L. Buckley, Jane B. Smith, William F. Buckley, Jr., Patricia B. Bozwell, Fergus R. Buckley, Maureen Buckley, and Connecticut Bank & Trust Co., guardian of the estate of Carol Buckley, and a two percent interest to C. Dean Reasoner
Original application May 10, 1952, Ser. No. 287,101, now Patent No. 2,843,536, dated July 15, 1958. Divided and this application May 2, 1958, Ser. No. 732,540
3 Claims. (Cl. 202—234)

The present invention relates to new and useful improvements in the solar distillation of sea water and the like to produce fresh or relatively pure water.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The present application is a division of my prior copending application Serial No. 287,101, filed May 10, 1952, now Patent Number 2,843,536.

The accompanying drawings, referred to herein and constituting a part hereof, illustrate one embodiment of the invention, and together with the description, serves to explain the principles of the invention.

Of the drawings:

FIGURE 1 is a fragmentary top plan view showing one embodiment of the present invention;

FIGURE 2 is a side elevation, partly in section, of the embodiment shown in FIGURE 1;

Figure 3:
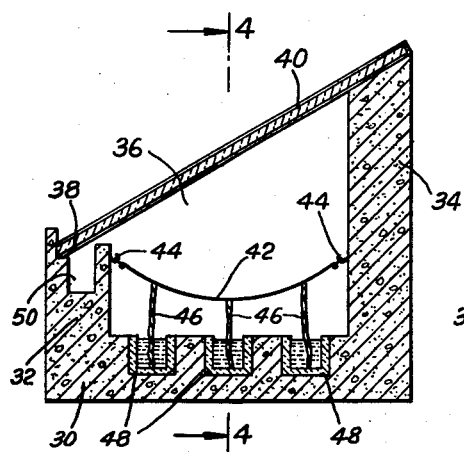
FIGURE 3 is a vertical section taken on the line 3—3 of FIGURE 2.

The present invention has for its object the provision of a novel and improved solar distillation apparatus for the distillation of fresh, potable water from sea water, brackish or otherwise contaminated water. A further object is the provision of a novel and improved apparatus of this kind which is relatively simple and economical in its construction, and can be operated for long periods of time without requiring the expenditure of excessive labor, and which is especially adapted for large scale application. A further object is the provision of apparatus of this kind which can be easily washed to free the apparatus from the excessive accumulations of salt which result from continued operation of the apparatus and otherwise gradually interfere with its efficient operation. The apparatus is particularly adapted to be constructed of durable, and relatively inexpensive materials of construction, and thus can be constructed for relatively small cost and for the distillation of whatever quantities of water are to be treated.

The present invention provides an efficient apparatus which is adapted to be supplied with a quantity of water contaminated with salts or other impurities, and to hold this quantity of water in a water-tight and substantially air-tight vessel while the water is fed in a thin layer over a large area and is exposed to the rays of the sun to heat the water and cause it to evaporate, the water vapor then condensing on a relatively cooler surface from which it drains by gravity into a collecting drain by which it is removed from the vessel and may be conveyed to a tank or other storage receptacle. Means are provided for spreading the water to be heated as a thin layer and preferably comprise a sheet of capillary material, such as black cotton cloth, to which the water is slowly fed by capillarity from a water reservoir below the sheet. Other means are provided for rinsing the sheet with fresh quantities of the impure water from time to time, and preferably at night or during times when the sun is obscured, so that any deposits of salt on the sheet are reduced or removed before they seriously interfere with the operation of the still. In one form, the sheet is positioned and the vessel is so formed that the level of the salt water may be raised to the level where the sheet is submerged in the salt water used for rinsing, thereby allowing the rinsing water to dissolve out the salts as it flows over the sheet and into the salt water drain portion of the vessel.

The feed water is preferably stored in a reservoir having a relatively large area and is covered with a supernatant layer of radiation absorbing, immiscible material, such as black oil, so that it may be preheated by solar radiation, and is fed from the reservoir as needed to the several solar stills.

In actual practice, the apparatus may be spread over large areas, such as several acres, comprising one or more large reservoirs for preheating the water, and a relatively large number of interconnected distillation units, from which the fresh water is collected into fresh water reservoirs, while the partially distilled salt feed water is drained off, and would ordinarily be returned to the sea or used as a source of concentrated brine.

It will be understood that the foregoing general description and the following detailed description as well are exemplary and explanatory of the invention but are not restrictive thereof.

Referring now in detail to the present preferred and illustrative embodiment of the present invention as shown in FIGURES 1 to 4 of the accompanying drawings, there is provided a large reservoir 10, which is connected by piping to feed by gravity to a plurality of distillation units 12, from which the salt water is drained into one or more waste tanks 14, while the fresh or salt-free water is drained into and collected in the fresh water tank 16.

The brine reservoir 10 preferably comprises a shallow tank which is supplied with salt water, brine or other water to be purified from the sea or other source through a pipe 20, the water being pumped into the reservoir 10 at such a rate that a substantially constant level is maintained. In actual practice, the water in the tank 10 is preferably about 6 inches deep and should not exceed one or two feet in depth. The tank 10 is preferably constructed of durable waterproof material such as concrete or resistant wood, such as cypress, and may have an area of as much as a few acres.

Preferably, and for the efficient preheating of the water in the tank 10, there is provided on the surface of the water a thin layer of a heat absorptive material 18 which is immiscible with the water and which does not contaminate the water. This material is preferably a liquid and is chosen so as to have a high degree of absorption for solar radiation. For this purpose, a dark heavy petroleum oil, soft still pitch or asphaltum is suitable, and is preferably used in a layer not exceeding ¼ inch in thickness. Such material forms a thin supernatant layer which is in intimate thermal contact with the body of water and transfers its absorbed heat directly to the water with a minimum of loss. Floating sheets of dark or black material, such as blackened metal pans may also be used.

The preheated water is fed from the brine tank 10 through distribution pipes 22 to the individual distillation units 12, the gravitational flow of the water being regulated by means of the valves 24, so that the rate of feed is normally two to four or five times or only slightly in excess of the rate at which the water is distilled by the distillation units. An excessive rate of water feed from the tank 10 to the distillation units 12 results in a correspondingly lowered efficiency of the distillation units due to the heat lost by the effluent water.

Figure 4:
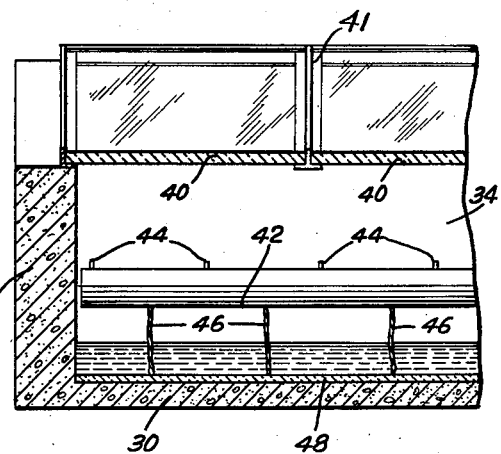
FIGURE 4 is a sectional view taken on the line 4—4 of FIGURE 3.

FIGURES 3 and 4 illustrate in detail the distillation unit 12 shown in FIGURES 1 and 2. As embodied, the unit comprises a water-tight and substantially air-tight trough-like container formed from concrete, resistant wood or other suitable constructional material and preferably relatively narrow and long. In actual practice, the distillation units would be two or only a few feet wide, and may be extended as far as practical considering the necessity for insuring gravitational flow of the water contained in them, and at the same time avoiding excessive depths of water at any portion of the apparatus. The units are accurately oriented and extend lengthwise in an easterly and westerly direction so as to receive a maximum amount of solar radiation.

Each distillation unit, so constructed, comprises a bottom wall 30, a low southerly (in the Northern Hemisphere) wall 32 and a higher northerly wall 34, the angle formed by the upper edges of the southerly and northerly walls corresponding generally to the latitude of the installation. Suitable end walls 36 are provided which form a water-tight trough with the bottom, southerly and northerly walls, 30, 32 and 34.

The upper inner edge of the southerly wall 32 is preferably provided with a level flat shoulder 38, and the northerly wall 34 is slanted so that sheets of glass 40 may be laid and supported thereon to provide a substantially airtight enclosure within the trough of the distillation unit. If desired, other transparent, air-tight, water-resistant material than glass may be employed, such as plastic sheet material, but in general glass is less expensive, more durable, and forms a less complex structure due to its strength and self-supporting characteristics. The sheets of glass 40 may be relatively narrow and are laid edge to edge to completely cover the upper portion of the trough, preferably being sealed by rubber gaskets 41.

Within the trough portion of each distillation unit is supported a sheet 42 of capillary, radiation absorbent material, such as black cotton cloth, such as percale, muslin or canvas, preferably suitably treated to prevent fungus growth, as by impregnation with copper naphthenate. This sheet 42 preferably extends lengthwise of the trough, and is supported along its edge by means of suitable fastening means 44 to the inner side of the walls 32 and 34. Preferably, the sheet 42 is supported so that its side edges are spaced from the inner surfaces of the walls 32 and 34, thereby providing for circulation of the water-saturated air between the spaces above and below the sheet 42.

Salt water is continually fed to the evaporating sheet 42 so that it is maintained saturated, and for this purpose, a plurality of absorbent or capillary wicks 46 extend downwardly from the sheet 42 and dip into narrow longitudinal troughs 48 having linings of poorly heat conductive material, such as cypress, which are formed in the bottom wall member 30, the troughs 48 being kept filled with salt water from the distribution pipes 22. Wicks 46 are preferably formed of highly absorbent material such as loosely twisted strands of clean cotton, narrow, heavy cotton ribbon, or like bodies formed of rayon or linen, and are in intimate contact with the sheet 42 at their upper ends, ordinarily being sewed thereto so as to insure efficient capillary transfer of the water raised by them to the sheet 42.

Means are provided for collecting and draining off the distilled fresh water, which drains by gravity from the inclined sheets 40, and for this purpose the upper edge of the southerly wall 32 is conveniently formed as a trough 50 extending from and to the end of the unit 12, the trough 50 sloping very slightly so the condensed water on sheets 40 runs into trough 50, and the fresh water flows toward the discharge end and into the fresh water discharge pipe 52 which leads it to the fresh water receiving tank 16. If desired, a valve 54 may be provided in the fresh water pipe 52.

The narrow troughs 48 in which the salt water is contained are also sloped gently towards the discharge end of the apparatus where they are joined together and lead into a discharge pipe 58 provided with a flow valve 60, so that the gravitational flow of the salt water through the unit 12 and into the discharge pipe 58 may be regulated by the valve 60. The feed end and the discharge end of the narrow troughs are sloped but not to a sufficient extent to prevent water standing all along the length of the troughs 48, so that all portions of the sheet 42 may be fed thereby.

In operation, the brine fed reservoir 10 is filled sufficiently with sea water and preferably covered with the supernatant layer of heat absorptive material 18. Valve 24 is then opened to a slight extent, valve 54 is preferably opened fully, and valve 60 is opened to permit a restricted flow somewhat less than that permitted by the valve 24. Water is then fed to the tank 10 at a rate such that the level of the water in the tank 10 is maintained substantially constant.

Under these conditions and during the sunny hours of the day, the water in the tank 10 is preheated by the solar radiation and this preheated water is continuously fed to the narrow supply troughs 48 where it is picked up by the wicks 46 and fed by capillarity to and completely over the sheet 42 which acts as a radiation absorber and water evaporator. The general inclination of the sheet 42 is such that it receives the maximum amount of solar radiation throughout the day. For this purpose, the inclination of the sheet 42 with respect to the earth is slightly more than the latitude of the location; that is, it is inclined somewhat more than is required for it to be normal to the sun's rays at noon at the summer solstice, and the sheet 42 and the troughs 48 extend in a generally easterly and westerly direction.

In this position, the salt water supported by the black evaporator sheet 42 is rapidly heated by the sun's rays, even on cloudy days, often being heated as much as 70° or 80° F. above the ambient temperature, and thereby greatly increasing the vapor pressure of the water vapor in the body of air contained within the distillation unit 12. The glass or other transparent member 40 being exposed to the external air on its upper surface tends to assume the ambient temperature although it is heated on its lower surface by the mass of air within the distillation unit 12. However, it does prevent excessive heat loss from within the unit 12 while maintaining itself as the colder surface so that it acts as both a radiation transmitting member and as a condenser surface on which the distilled water collects as the vapor-laden air within the unit impinges on its under surface. As the sheet 42 is spaced from the inner walls 32 and 34, air can circulate with considerable freedom within the unit 12, and the temperature differential between the sheet 42 and the condenser 40 causes a thermal current of the air which increases the rate of air circulation, and thereby increases both the rate of evaporation from the evaporator sheet 42 as well as the rate of flow past the condenser surface of sheet 40, thereby increasing the rate of distillation of the water.

In equatorial regions, between the tropics of Cancer and Capricorn, it is generally advisable to provide for a minimum inclination of the condenser surface of 15° or 20° with respect to the level surface of the earth, so that a sufficiently rapid flow of the condenser droplets of water is maintained and assured.

The useful distillation of water from the fed salt water continues long after sundown, due to the temperature of the pre-heated water in tank 10, the heat capacity of the distillation unit, and the usual reduction in the ambient temperature consequent upon the setting of the sun.

When the useful distillation of water has ceased for the day, one or more hours after sundown, or whenever necessary, the accumulated salts on the evaporator sheets 42 may be disposed of and kept from accumulating to the extent where they interfere with efficient operation of the distillation unit. At this time, the valve 60 is closed on each unit 12, and the valve 24 is opened to allow the interior of the distillation units to fill with a fresh full charge of salt water sufficient to submerge the entire sheet 42, but not enough to flow into the fresh water drain trough 50. This operation may be repeated one or more times, if necessary, with sufficient soaking time at each operation, so that the accumulated salt deposits on the sheet 42 are dissolved in the rinsing charge of salt water and washed out when the valve 24 is closed and the valve 60 is opened to allow the rinsing water to be drained from the unit 12.

The apparatus is then ready to be recharged and its valves 24, 54 and 60 set for the next day's operation when the sun rises. With proper regulation of the rate of salt water fed to and from the distillation units 12, the apparatus is entirely automatic during its distillation operation, and additionally needs only a daily or more or less frequent rinsing to mtaintain it in efficient operation over long periods of time.

The apparatus is easily repaired in case of accident, or when the evaporator sheet needs replacing. The evaporator 42 is preferably supported on hooks so that it is easily replaced, and when necessary the glass sheets 40 may be replaced, or cleaned merely by wiping them off on their upper surface, turning them over and replacing them in position with their other surface uppermost.

The invention in its broader aspects is not limited to the specific mechanisms shown and described but departures may be made therefrom within the scope of the accompanying claims without departing from the principles of the invention and without sacrificing its chief advantages.

What is claimed is:

1. Solar distillation apparatus including, in combination, an air-tight housing having a transparent, inclined condenser surface forming the top wall of said housing, condensate collecting means open at the top and positioned within the housing and below the lowermost point of said condenser surface to receive the condensate therefrom, outlet means permitting the discharge of water from said condensate collecting means, a light-absorbing capillary sheet mounted within the housing and receiving light through said condenser surface and forming thereby an evaporable surface thereon, said capillary sheet at all points lying below the open end of said condensate collecting means, impure water supply means positioned below said capillary sheet, said supply means including trough means for receiving impure water therein, inlet means for feeding impure water to said trough means, outlet means permitting the discharge of said impure water from said housing and capillary wicks, each of said wicks having one end within said trough means and the other end in contact with said capillary sheet for feeding impure water from said trough means to said capillary sheet, and means for raising the level of the impure water in said supply means to a height sufficient to immerse said capillary sheet but insufficient to permit the entry of such water in the open end of said condensate receiving means.

2. A solar distillation apparatus in accordance with claim 1, which includes preheated reservoir means operatively connected to said impure water supply means, said reservoir means including heat absorption material in thermal contact with the supply water in said reservoir.

3. Solar distillation apparatus as claimed in claim 1 in which the impure water supply trough is heat-insulated from the remainder of the housing.

References Cited in the file of this patent

UNITED STATES PATENTS 1,812,516    Dooley _____ June 30, 1931

FOREIGN PATENTS 28,130    Great Britain _____ 1907

OTHER REFERENCES

Harding: Institution of Civil Engineering Proceedings, vol. 73, February to April 1883, pages 284–288.